(12) United States Patent
Tsuchiya

(10) Patent No.: US 12,042,974 B2
(45) Date of Patent: *Jul. 23, 2024

(54) PRODUCTION DEVICE AND PRODUCTION METHOD FOR RESIN CONTAINERS

(71) Applicant: NISSEI ASB MACHINE CO., LTD., Nagano (JP)

(72) Inventor: Yoichi Tsuchiya, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,919

(22) Filed: Jun. 30, 2023

(65) Prior Publication Data

US 2023/0339165 A1     Oct. 26, 2023

Related U.S. Application Data

(63) Continuation of application No. 17/427,494, filed as application No. PCT/JP2020/003640 on Jan. 31, 2020, now Pat. No. 11,731,336.

(30) Foreign Application Priority Data

Jan. 31, 2019   (JP) ................. 2019-015973

(51) Int. Cl.
   *B29C 49/64*   (2006.01)
   *B29C 49/06*   (2006.01)
   (Continued)

(52) U.S. Cl.
   CPC .............. *B29C 49/06* (2013.01); *B29C 49/28* (2013.01); *B29C 49/6427* (2013.01); *B29K 2067/003* (2013.01); *B29L 2031/7158* (2013.01)

(58) Field of Classification Search
   CPC ..... B29C 49/6427; B29C 49/64; B29C 49/06; B29C 49/28; B29C 49/36
   See application file for complete search history.

(56) References Cited

U.S. PATENT DOCUMENTS 11,731,336 B2 * 8/2023 Tsuchiya ................. B29C 49/02
                                                    264/537
2004/0022974 A1   2/2004 Nakamura et al.
(Continued)

FOREIGN PATENT DOCUMENTS

CA     1065563    11/1979
GB     1528847    10/1978
(Continued)

OTHER PUBLICATIONS

International Search Report issued in International Patent Application No. PCT/JP2020/003640, dated Apr. 14, 2020, along with English Translation thereof.
(Continued)

*Primary Examiner* — Robert B Davis
(74) *Attorney, Agent, or Firm* — Greenblum & Bernstein, P.L.C.

(57) ABSTRACT

A manufacturing apparatus for manufacturing a resin container including an injection molding part configured to injection-mold a preform, and a temperature adjustment part configured to adjust a temperature of the preform molded in the injection molding part. The manufacturing apparatus is configured to blow-mold the preform whose temperature has been adjusted in the temperature adjustment part. The injection molding part includes an injection core mold and an injection cavity mold, and both the injection core mold and the injection cavity mold include a flow path connected to a chiller in which coolant is configured to flow to cool the preform such that the preform is inserted into the temperature adjustment part in a state where an outer surface
(Continued)

temperature of the preform is higher than a glass transition temperature of a material constituting the preform by 30° C. or higher and 60° C. or lower.

6 Claims, 6 Drawing Sheets

(51) Int. Cl.
*B29C 49/28* (2006.01)
*B29K 67/00* (2006.01)
*B29L 31/00* (2006.01)

(56) References Cited

U.S. PATENT DOCUMENTS

| | | |
|---|---|---|
| 2004/0151937 A1 | 8/2004 | Hutchinson |
| 2006/0290035 A1 | 12/2006 | Yoshiike et al. |
| 2014/0131920 A1 | 5/2014 | Nakahara |
| 2016/0361860 A1 | 12/2016 | Nakahara |
| 2018/0079127 A1 | 3/2018 | Aoki |

FOREIGN PATENT DOCUMENTS

| | | |
|---|---|---|
| JP | 51-114468 | 10/1976 |
| JP | 5-185493 | 7/1993 |
| JP | 5-330535 | 12/1993 |
| JP | 6-315973 | 11/1994 |
| JP | 2002-172681 | 6/2002 |
| JP | 2006-346891 | 12/2006 |
| JP | 4582464 | 11/2010 |
| KR | 2002-0048103 | 6/2002 |
| WO | 2013/012067 | 1/2013 |
| WO | 2017/098673 | 6/2017 |

OTHER PUBLICATIONS

Written Opinion of the International Searching Authority issued in International Patent Application No. PCT/JP2020/003640, dated Apr. 14, 2020, along with English Translation thereof.
Extended European Search Report Issued in Corresponding EP Patent Application No. 20748125.0, dated Sep. 9, 2022.
Office Action issued in Corresponding KR Patent Application No. 10-2023-7010786, dated Nov. 30, 2023, along with an English translation thereof.

* cited by examiner

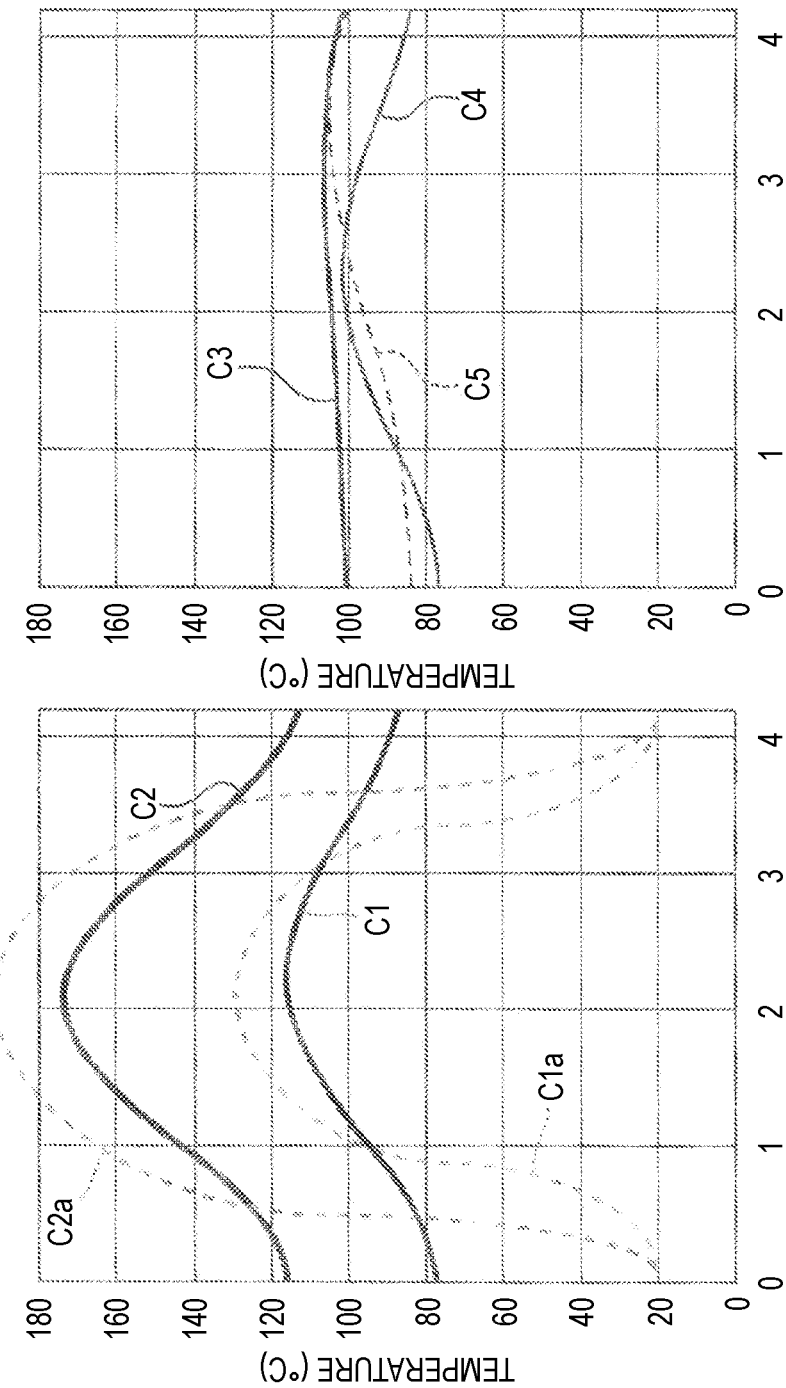

PRODUCTION DEVICE AND PRODUCTION METHOD FOR RESIN CONTAINERS

CROSS-REFERENCE TO RELATED APPLICATIONS

This is a continuation of U.S. patent application Ser. No. 17/427,494, filed Jul. 30, 2021, which is a National Phase application of International Application No. PCT/JP2020/003640, filed Jan. 31, 2020, which claims the benefit of priority to Japanese Patent Application No. 2019-015973, filed on Jan. 31, 2019. The disclosure of each of the above-mentioned documents, including the specification, drawings, and claims, is incorporated herein by reference in its entirety.

TECHNICAL FIELD

The present invention relates to a manufacturing apparatus and a manufacturing method for manufacturing a resin container by a hot parison type blow molding method. Specifically, the present invention relates to a manufacturing apparatus and a manufacturing method for manufacturing a resin container by a hot parison type blow molding method, which enable a resin container having good appearance and physical properties to be manufactured even if a manufacturing time is shortened.

BACKGROUND ART

Conventionally, a blow molding apparatus including an injection molding part configured to injection-mold a preform, a temperature adjustment part configured to adjust a temperature of the preform molded in the injection molding part, and a blow molding part configured to blow-mold the preform whose temperature has been adjusted in the temperature adjustment part is known (for example, refer to Patent Literature 1). This type of blow molding apparatus is an apparatus where the temperature adjustment part is added to a conventional blow molding apparatus (for example, refer to Patent Literature 2) mainly having the injection molding part and the blow molding part. The preform immediately after molded in the injection molding part does not have a temperature distribution suitable for blow molding. Therefore, the temperature adjustment part capable of more aggressively adjusting a temperature of the preform is provided between the injection molding part and the blow molding part, so that the temperature of the preform can be adjusted to a temperature suitable for blow molding. Note that, the temperature adjustment part uses a heating pot mold (heating block) and a heating rod, and adjusts the temperature of the preform by heating the preform in a non-contact manner.

In addition, there is a temperature adjustment method in a case of molding a container (cosmetic container) where only a bottom portion is formed thick. Specifically, suggested is a blow molding apparatus including a temperature adjustment part for performing temperature adjustment for a preform of the container so as to provide a temperature distribution suitable for blow molding, in which outer peripheral surfaces of a bottom portion of the preform and a lower part of the body portion continuing to the bottom portion are mechanically brought into close contact and securely cooled with a cooling pot, and the body portion except the lower part of the body portion continuing to the bottom portion is heated to a predetermined temperature by the heating block, so that a container including a bottom portion having a desired thickness and a body portion having a wall portion stretched in a uniform and thin thickness when performing blow molding is manufactured (for example, refer to Patent Literature 3). In addition, suggested is a blow molding apparatus configured to shorten an injection molding time that determines a molding cycle time by cooling a preform in the injection molding part and further cooling the preform in the temperature adjustment part (for example, refer to Patent Literature 4).

CITATION LIST

Patent Literature

Patent Literature 1: JP-A-H06-315973
Patent Literature 2: WO 2017/098673 A1
Patent Literature 3: WO 2013/012067 A1
Patent Literature 4: JP-A-H05-185493

SUMMARY OF INVENTION

Technical Problem

However, according to the conventional blow molding apparatus, when the cooling time after injection molding is set short, it is not possible to sufficiently remove temperature unevenness or uniformize the temperature in the temperature adjustment part. In addition, a method capable of manufacturing a high-quality container where thickness unevenness and whitening (cloudiness; which occurs when a thermoplastic resin such as PET (polyethylene terephthalate), which is likely to crystallize during blow molding, is used as a material) are favorably suppressed has not been established.

An object of the present invention is to provide a manufacturing apparatus and a manufacturing method for manufacturing a resin container, capable of manufacturing a container of good quality even by a hot parison type blow molding method where a molding cycle time is shortened.

Solution to Problem

The present invention provides a manufacturing apparatus for manufacturing a resin container, the manufacturing apparatus including: an injection molding part configured to injection-mold a preform; and a temperature adjustment part configured to adjust a temperature of the preform molded in the injection molding part, in which the manufacturing apparatus is configured to blow-mold the preform whose temperature has been adjusted in the temperature adjustment part, the preform is inserted into the temperature adjustment part in a state where an outer surface temperature of the preform is higher than a glass transition temperature of the preform by 30° C. or higher and 60° C. or lower, and the preform is cooled to a predetermined temperature suitable for blow molding in the temperature adjustment part.

In this case, the temperature adjustment part may be configured to sandwich and the preform with a temperature adjustment core mold and a temperature adjustment cavity mold to compression-deform the preform. The temperature adjustment part may be configured to circulate air inside the preform.

Further, the present invention provides a manufacturing method for manufacturing a resin container including injection-molding a preform, adjusting a temperature of the preform to which the injection-molding has been performed in a temperature adjustment part, and blow-molding the preform whose temperature has been adjusted, in which the preform is inserted into the temperature adjustment part in a state where an outer surface temperature of the preform is higher than a glass transition temperature of the preform by 30° C. or higher and 60° C. or lower, and the preform is cooled to a predetermined temperature suitable for blow molding in the temperature adjustment part.

In this case, the temperature adjustment part may be configured to sandwich the preform with a temperature adjustment core mold and a temperature adjustment cavity mold to compression-deform the preform. The temperature adjustment part may be configured to circulate air inside the preform.

Further, the present invention provides a manufacturing apparatus for manufacturing a resin container, the manufacturing apparatus including an injection molding part configured to injection-mold a preform, and a blow molding part configured to blow-mold the preform molded in the injection molding part, in which the preform is inserted into the blow molding part after increasing an outer surface temperature of the preform by 80° C. or more as compared to the outer surface temperature of the preform when the preform is demolded from the injection molding part, the outer surface temperature of the preform being increased by 80° C. or more before 4 seconds or longer and 8 seconds or shorter elapses since the preform has been demolded from the injection molding part.

Further, the present invention provides a manufacturing method for manufacturing a resin container by using an injection molding part configured to injection-mold a preform, and a blow molding part configured to blow-mold the preform molded in the injection molding part, the manufacturing method including increasing an outer surface temperature of the preform by 80° C. or more as compared to the outer surface temperature of the preform when the preform is demolded from the injection molding part, the outer surface temperature of the preform being increased by 80° C. or more before 4 seconds or longer and 8 seconds or shorter elapses since the preform has been demolded from the injection molding part, and inserting the preform into the blow molding part.

Advantageous Effects of Invention

According to the present invention, it is possible to provide the manufacturing apparatus and the manufacturing method for manufacturing a resin container, capable of manufacturing a container of good quality even by a hot parison type blow molding method where a molding cycle time is shortened.

BRIEF DESCRIPTION OF DRAWINGS

FIG. 6(a) and FIG. 6(b) are graphs of a temperature distribution when a temperature of a preform is adjusted.

DESCRIPTION OF EMBODIMENTS

Hereinafter, favorable embodiments of the present invention will be described with reference to the drawings.

Figure 1:
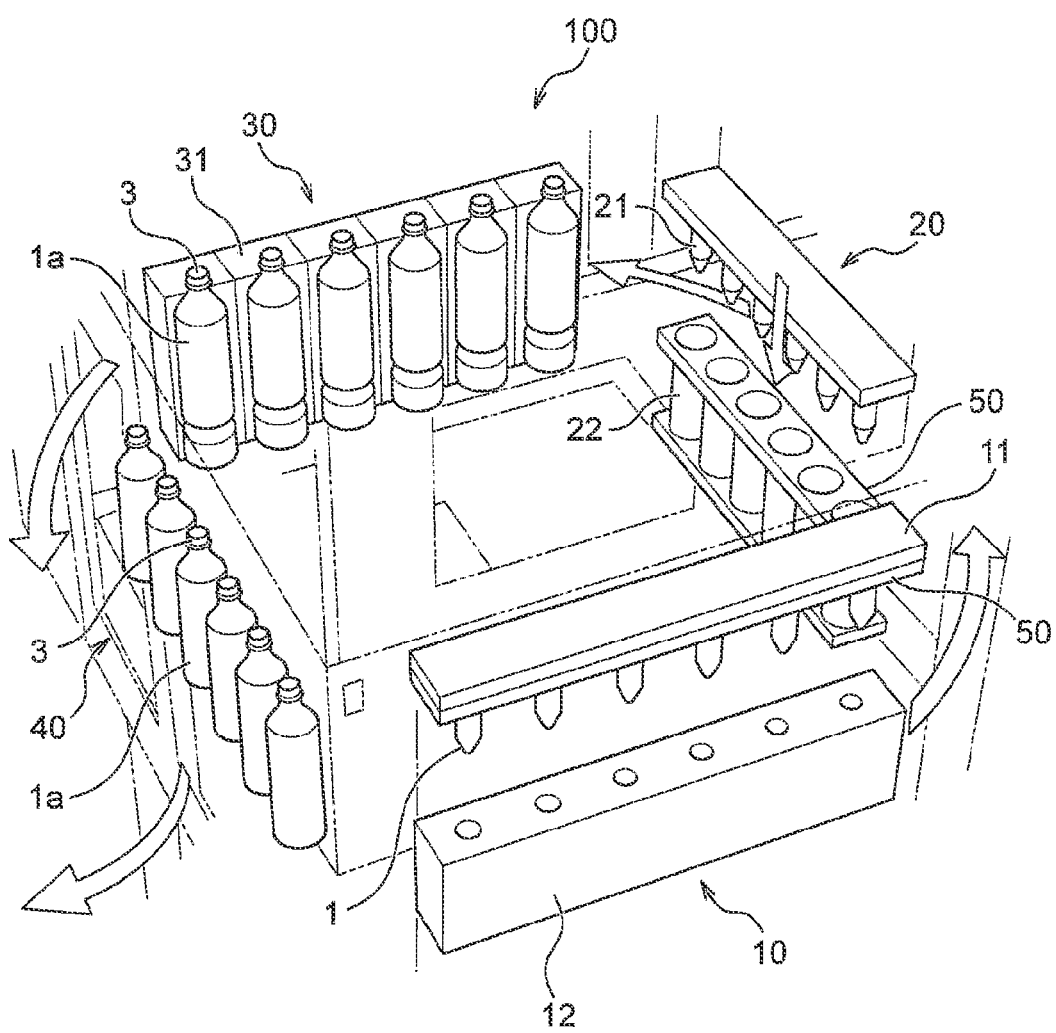
FIG. 1 is a perspective view of a blow molding apparatus (including an injection molding part, a temperature adjustment part, a blow molding part and a take-out part) according to one embodiment of the present invention.
Figure 2:
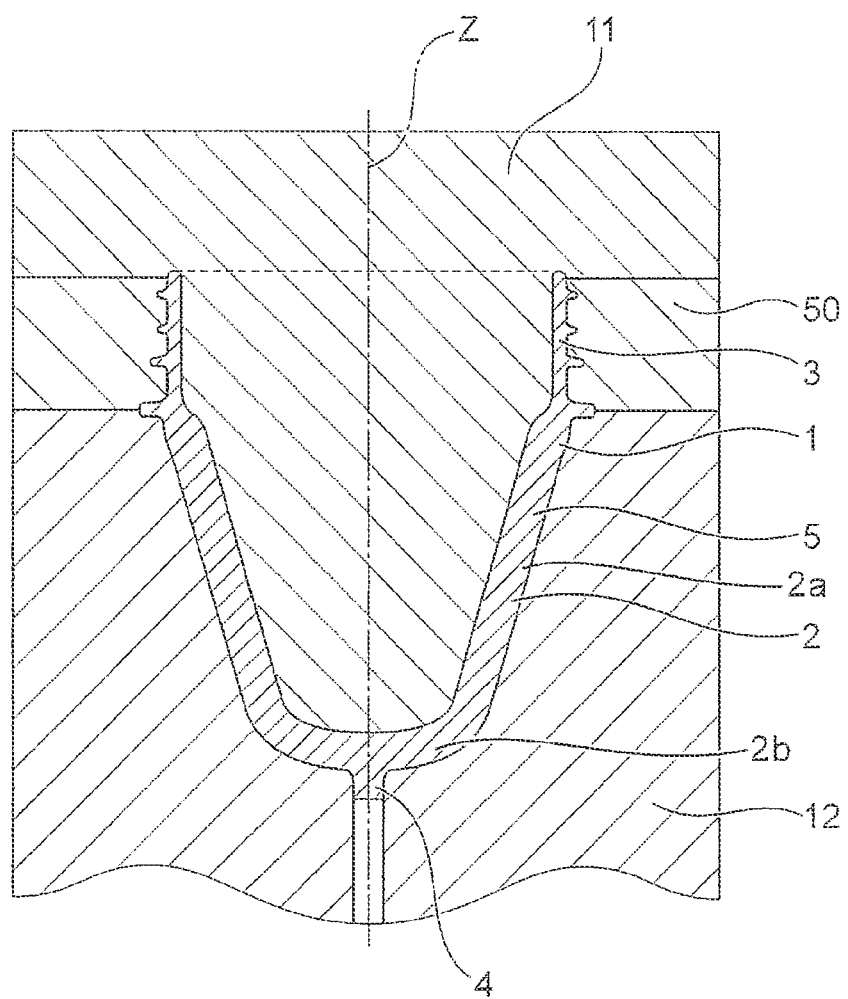
FIG. 2 is an enlarged cross-sectional view of a preform injection-molded in the injection molding part, as seen from the front.
Figure 3:
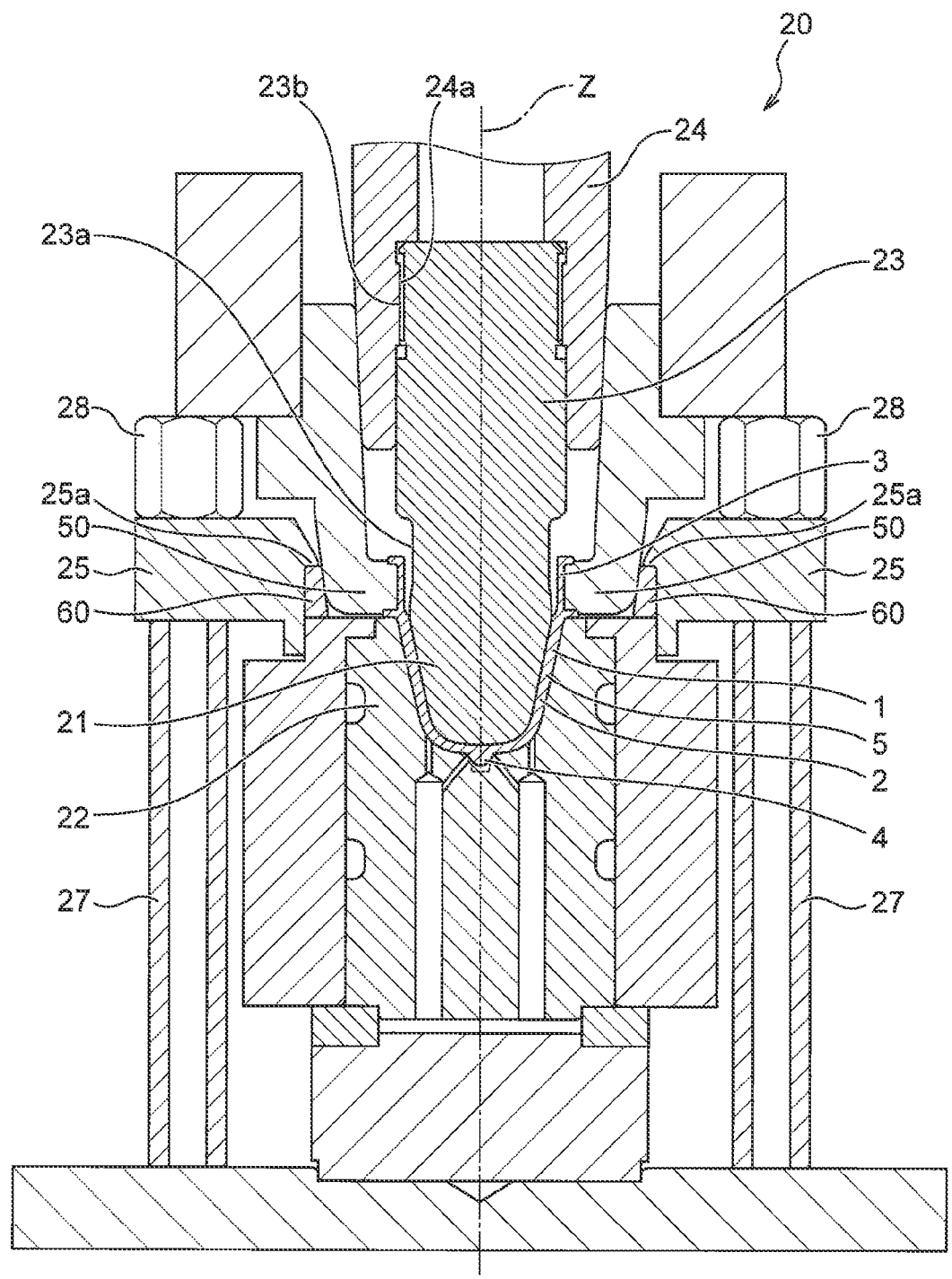
FIG. 3 is a schematic view of the temperature adjustment part.
Figure 4:
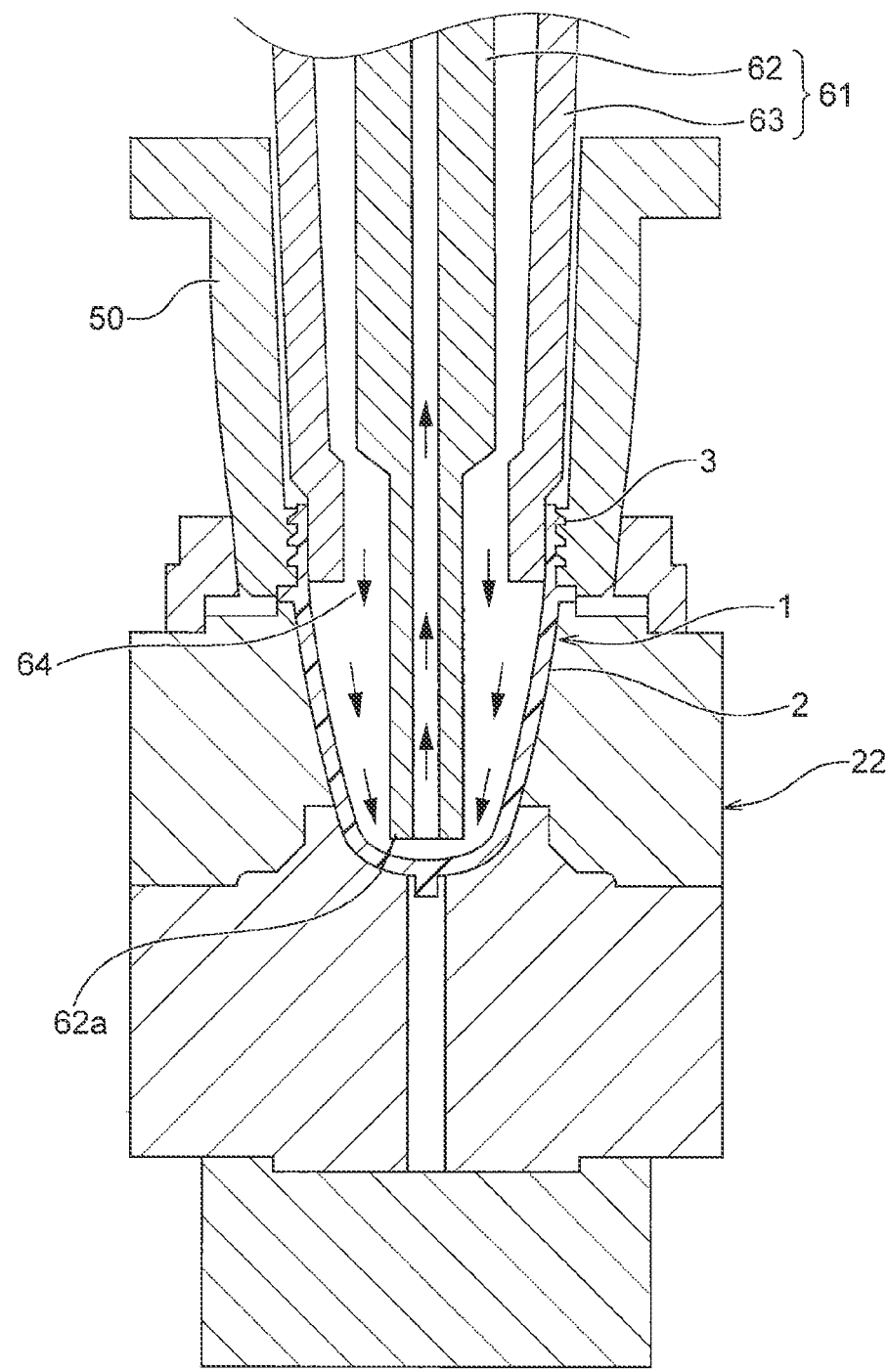
FIG. 4 shows another example of the temperature adjustment part.
Figure 5:
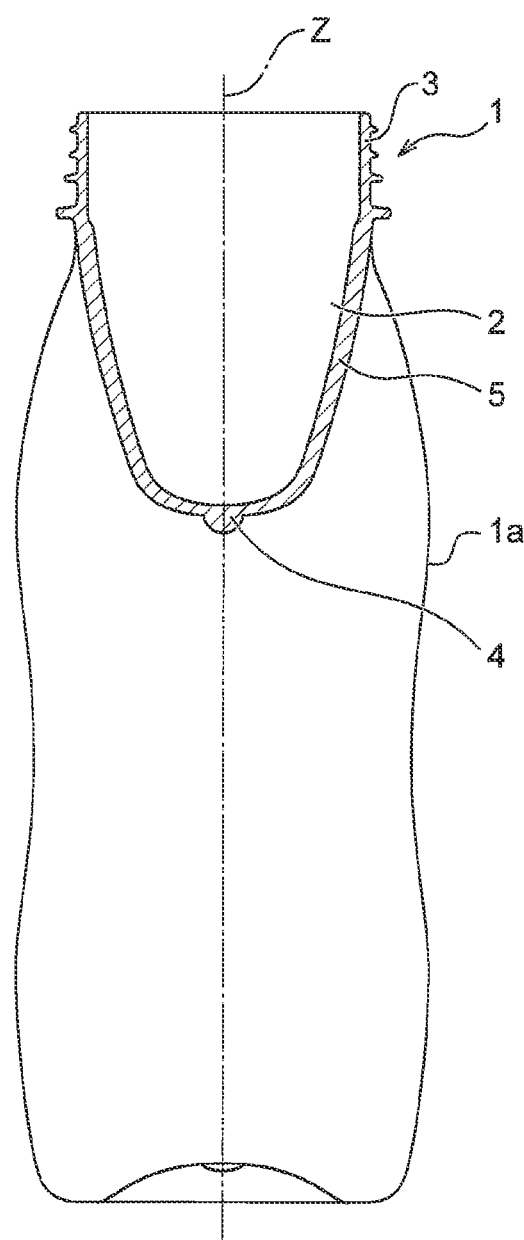
FIG. 5 is a cross-sectional view showing a state where the preform is blow-molded in the blow molding part.

FIG. 1 is a perspective view of a blow molding apparatus (including an injection molding part, a temperature adjustment part, a blow molding part and a take-out part) according to one embodiment of the present invention, FIG. 2 is an enlarged cross-sectional view of a preform injection-molded in the injection molding part, as seen from the front, FIG. 3 is a cross-sectional view of the temperature adjustment part, as seen from the front, FIG. 4 is an enlarged cross-sectional view of the preform temperature-adjusted in the temperature adjustment part, and FIG. 5 is a cross-sectional view showing a state where the preform is blow-molded in the blow molding part.

As shown in FIG. 1, a blow molding apparatus (a manufacturing apparatus for manufacturing a resin container) 100 is an apparatus including an injection molding part 10, a temperature adjustment part 20, a blow molding part 30, and a take-out part 40 and configured to manufacture a container 1a by injection-molding a preform 1 and then blow-molding the preform 1.

The injection molding part 10, the temperature adjustment part 20, the blow molding part 30, and the take-out part 40 are arranged in alignment of forming four sides of a square, as seen from above. A rotation plate (not shown) provided with a neck mold 50 (refer to FIG. 3) configured to hold a neck portion 3 (refer to FIG. 2) of a preform 1 molded in the injection molding part 10 is provided above the parts. The rotation plate has four sets of neck molds 50 arranged in alignment of forming four sides of a square, as seen from above. Thereby, when the rotation plate is rotated about a vertical shaft in a counterclockwise direction by 90 degrees above the injection molding part 10, the temperature adjustment part 20, the blow molding part 30 and the take-out part 40, each of the four sets of the neck molds 50 sequentially moves to the injection molding part 10, the temperature adjustment part 20, the blow molding part 30 and the take-out part 40 with the same time, so that each process is performed for the preform 1 held by the neck mold 50 for the same time.

The injection molding part 10 includes an injection core mold 11, an injection cavity mold 12 and an injection device (not shown), and is configured to injection-mold the preform 1.

As shown in FIG. 2, the preform 1 has a bottomed shape (bottomed hollow shape) having a neck portion 3 on an opened side and a storage portion 2 (main body portion) 2 on a closed side. The preform 1 is formed into a container 1a (refer to FIG. 5) by blow molding, and has a shape having a thick thickness, which is obtained by shrinking the blow-molded container 1a in an upper and lower direction and in a right and left direction in FIG. 5. The storage portion 2 includes a body portion 2a on the opened side and continuing to the neck portion 3, and a bottom portion 2b positioned on the closed side and continuing to the body portion 2a. The injection core mold 11 and the injection cavity mold 12 are formed with a flow path (not shown) which is connected to a chiller and through which a low-temperature (for example, 5° C. or higher and 20° C. or lower) coolant flows.

When injection-molding the preform 1, the injection core mold 11, the injection cavity mold 12 and the neck mold 50 are combined to define a space corresponding to the preform 1. At this time, inner surface shapes of the storage portion 2 and neck portion 3 of the preform 1 are formed by the injection core mold 11, an outer surface shape of the storage portion 2 is formed by the injection cavity mold 12, and an outer surface shape of the neck portion 3 is formed by the neck mold 50.

The injection molding part 10 is configured to form a surface layer (skin layer) of the storage portion 2 and to mold the preform 1 by heating and melting a material such as a thermoplastic synthetic resin (for example, a polyester-based resin such as PET (polyethylene terephthalate) and the like) to high temperatures, injecting and filling the melted material into a molding space (cavity) defined by the injection core mold 11, the injection cavity mold 12 and the neck mold 50 by the injection device (not shown), and cooling and solidifying the material of a part, which is close to a mold surface (cavity surface), of the injected material to a temperature lower than a melting point (for example, about 255° C. in the case of PET). At this time, an inner portion layer (core layer) of the storage portion 2 of the preform 1 is maintained to a temperature (for example, 150° C. to 200° C.) equal to or lower than the melting point and equal to or higher than a glass transition temperature, and is adjusted to have an amount of heat (residual heat) by which the storage portion 2 can be stretched in the blow molding part 30. Note that, in the present invention, a molding cycle time, i.e., a molding time of the preform 1 is shortened, as compared to conventional art. Specifically, among an injection time (filling time) and a cooling time which constitute the injection molding time of the preform, the cooling time is set significantly shorter than that of the conventional art. For example, the cooling time is set to ⅔ or less, preferably ½ or less, and more preferably ⅓ or less of the injection time.

The injection core mold 11 is formed so that a traverse cross-section of a portion corresponding to the storage portion 2 (more specifically, the body portion 2a) of the preform 1 is smaller than a traverse cross-section of a portion corresponding to the neck portion 3. Thereby, an inner side of the injection-molded preform 1 is formed so that an internal space area of the storage portion 2 in a direction perpendicular to an axis center Z of the preform 1 is smaller than that of the neck portion 3.

In addition, the injection core mold 11 is formed so that a traverse cross-section becomes gradually smaller toward a position on the mold surface (cavity surface) corresponding to the bottom portion 2b of the preform 1. Thereby, the inner side of the injection-molded preform 1 is formed so that the internal space area expanding in the direction perpendicular to the axis center Z of the preform 1 becomes gradually smaller toward the bottom portion 2b of the preform 1.

The preform 1 solidified to some extent (a degree that a surface layer is formed on inner and outer surfaces of the storage portion 2 and an outer shape can be maintained) after injection-molded in the injection molding part 10 is pulled out (demolded) with being held on the neck mold 50 from the injection cavity mold 12 and the injection core mold, and is conveyed to the temperature adjustment part 20 as the rotation plate is rotated in the counterclockwise direction by 90 degrees as shown in FIG. 1. Since the preform 1 is demolded from the injection molding part 10 at a higher temperature than the conventional art, the surface layer of the storage portion 2 is formed thin but the inner layer is formed thick, so that the residual heat higher than that of the conventional art is maintained.

The temperature adjustment part 20 is arranged next to the injection molding part 10, and includes one of a temperature adjustment core mold 21 or an air introduction/discharge member 61, and a temperature adjustment cavity mold 22, as shown in FIGS. 3 and 4.

The preform 1 conveyed from the injection molding part 10 is moved down together with the rotation plate until the neck mold 50 comes in contact with a centering ring 60 attached on the temperature adjustment cavity mold 22, and is inserted into the temperature adjustment cavity mold 22. When the preform 1 is inserted in the temperature adjustment cavity mold 22, the temperature adjustment core mold 21 or the air introduction/discharge member 61 is inserted into the preform 1 through an upper opening formed on the neck portion 3 of the preform 1. Note that, in a case of using the temperature adjustment core mold 21, the preform 1 may be inserted into the temperature adjustment cavity mold 22 together with the temperature adjustment core mold 21 after the temperature adjustment core mold 21 is inserted into the preform 1.

The temperature adjustment core mold 21 and the temperature adjustment cavity mold 22 are cooled to 10° C. or higher and 90° C. or lower, and preferably 60° C. or higher and 80° C. or lower as a coolant (temperature adjustment medium) flows through a flow path formed therein. The air introduction/discharge member 61 is configured to cause a compressed air for cooling of a predetermined temperature to flow in the storage portion 2. The preform 1 demolded from the injection molding part 10 in a higher temperature state than the conventional art and conveyed to the temperature adjustment part 20 is too high in temperature for blow molding, and also has temperature unevenness that has not been completely eliminated by cooling during conveying. By contact with the temperature adjustment core mold 21 and the temperature adjustment cavity mold 22 or by bringing the outer surface into contact with the temperature adjustment cavity mold 22 and blowing out the compressed air from the air introduction/discharge member 61 to the inner surface, the preform is cooled and is temperature-adjusted to a temperature suitable for blow molding.

FIG. 3 shows an example where the storage portion 2 of the preform 1 is cooled by the temperature adjustment cavity mold 22 and the temperature adjustment core mold 21. The temperature adjustment core mold 21 is formed with a narrowed portion 23a so as to prevent contact with the neck portion 3 when inserting the temperature adjustment core mold 21 into the temperature adjustment cavity mold 22.

The temperature adjustment core mold 21 of the present embodiment has a tapered shape with an angle smaller than the tapered injection core mold 11 of the injection molding part 10. Thereby, it is possible to compression-deform the preform 1 from a shape that can be easily removed (demolded) or molded from the injection molding part 10 into a desired shape that can be easily blow-molded.

As shown in FIG. 3, the temperature adjustment part 20 is provided so that the temperature adjustment core mold 21 contacts and presses the substantially entire inner surface of the storage portion 2 of the preform 1 and the temperature adjustment cavity mold 22 contacts and presses the substantially entire outer surface of the storage portion 2 of the preform 1. Thereby, even when the preform 1 is irregularly shrinkage-deformed after being demolded from the injection molding part 10, the shape of the preform 1 can be corrected by sandwiching the storage portion 2 of the preform 1 between the temperature adjustment core mold 21 and the temperature adjustment cavity mold 22. Here, the temperature adjustment part 20 may adjust the temperature inside and outside of the preform 1 at the same time while forcibly compression-deforming the preform 1 having a primary shape during injection molding into the preform 1 having a secondary shape suitable for blow molding into a final container 1a by cooling the preform 1 while pressurizing and sandwiching the preform 1 with the temperature adjustment core mold 21 and the temperature adjustment cavity mold 22.

Note that, in the present embodiment, the storage portion 2 of the preform 1 is cooled while pressurizing and sandwiching the same with temperature adjustment core mold 21 and temperature adjustment cavity mold 22. However, the present invention is not limited. For example, as shown in FIG. 4, the preform 1 may also be cooled using an alternative temperature adjustment part having the temperature adjustment cavity mold 22 and an air introduction/discharge member 61.

FIG. 4 shows an example where the storage portion 2 of the preform 1 is cooled by the temperature adjustment cavity mold 22 and the air introduction/discharge member 61. In FIG. 4, the air introduction/discharge member 61 includes a hollow rod member 62 having an air flowing hole provided therein, and a fitting core (a blow core member for temperature adjustment) 63.

The rod member 62 is accommodated to be movable up and down in the fitting core 63. A tip end of the rod member 62 is provided with an inner flowing port 62a through which air can be jetted or sucked. A temperature of the air is set as appropriate within a range of about 0° C. to about 20° C. (room temperature), according to a thickness of the preform 1 or the container Ta.

The fitting core 63 is configured to be fitted to (brought into close contact with) the neck portion 3 when the air introduction/discharge member 61 is inserted into (brought into contact in an airtight manner with) the preform 1. Thereby, it is possible to prevent the air in the preform 1 from leaking from the neck portion 3 toward an outer side of the fitting core 63. A gap between the rod member 62 and the fitting core 63 is an air flowing path for supplying/discharging the air with respect to the preform 1. A gap formed by a tip end of the fitting core 63 and the rod member 62 constitutes a first outer flowing port 64 through which the air can be jetted or sucked. Each of the inner flowing port 62a and the outer flowing port 64 can serve as a blowing port and a discharge port.

When adjusting the temperature of the preform 1, the preform 1 is first accommodated in a preform-shaped space of the temperature adjustment cavity mold 22. Then, the air introduction/discharge member 61 is inserted into (brought into contact in an air-tight manner with) the preform 1 accommodated in the cavity mold 22. Then, in a state where the first inner flowing port 62a is closed, preliminary blow of blowing the air from the outer flowing port 64 of the air introduction/discharge member 61 into the preform 1 to bring the storage portion 2 of the preform 1 into close contact with an inner wall of the cavity mold 22 is performed.

When the preliminary blow is over, cooling blow of opening the inner flowing port 62a to introduce air from the inner flowing port 62a into the preform 1 and discharging the air to an outside of the preform 1 through the outer flowing port 64 is performed. In this way, in the preliminary blow and the cooling blow, it is preferable to set the flowing directions of the air in opposite directions. At this time, since the air is continuously jetted from the inner flowing port 62a, the preform 1 is cooled from the inner side by convection of the air flowing in the preform 1. Further, since the preform 1 is in continuous contact with the cavity mold 22, the preform is temperature-adjusted or cooled so as not to be equal to or lower than a temperature suitable for blow molding from an outer side, and the temperature unevenness caused during the injection molding is also reduced. Note that, since the cavity mold 22 has the preform-shaped space, the shape of the preform 1 does not largely change. The preform 1 cooled for a predetermined time is moved to the blow molding part 30.

Note that, the air flowing direction of the air introduction/discharge member 61 can be changed as appropriate. For example, as shown in FIG. 4, during the cooling blow, the air may be sent from the outer flowing port 64, may pass an inside of the rod member 62 from the inner flowing port 62a and may be then discharged. At this time, during the preliminary blow, the air is preferably sent from the inner flowing port 62a into the preform 1, in a state where the outer flowing port 64 is closed. In a case where it is intended to increase a cooling effect on the lower side (the bottom-side of the storage portion 2) of the preform 1, the air is caused to flow from the inner flowing port 62a toward the outer flowing port 64. In a case where it is intended to increase a cooling effect on the upper side (the upper side of the storage portion 2) of the preform 1, the air is caused to flow from the outer flowing port 64 toward the inner flowing port 62a. Note that, for example, in a case where it is intended to intensively cool a specific part of the preform 1 to thereby increase a thickness of a specific part of the container Ta, the blowing directions of the air during the preliminary blow and the cooling blow may be set to be the same.

If the PET material is slowly cooled to a temperature zone of about 120° C. to 200° C., whitening or cloudiness is caused due to crystallization. Therefore, in order to manufacture the highly clear container 1a (refer to FIG. 5) from the preform 1 demolded in a high-temperature state from the injection molding part 10, it is necessary to quickly cool the preform 1 to a crystallization temperature range or lower. At this time, in a case of the preform 1 having a thick wall portion 5 at the storage portion 2, especially at the body portion 2b, it was difficult to sufficiently cool a center of the wall portion 5 in the conventional art. However, in the temperature adjusting method shown in FIG. 3, the wall portion 5 of the preform 1 is compression-molded even when the wall portion 5 of the preform 1 is thick, and in the temperature adjusting method shown in FIG. 4, the cooling air is caused to blow into the preform 1. Therefore, it is possible to significantly improve the efficiency of the temperature unevenness removing, the temperature uniformizing and the cooling. In addition, since the temperature distribution suitable for blow molding as a whole is obtained, it is possible to prevent unevenness of the thickness of the container 1a, which is a final form.

The preform 1 temperature-adjusted in the temperature adjustment part 20 is pulled out from the temperature adjustment cavity mold 22 with being held by the neck mold 50, and is conveyed to the blow molding part 30 as the rotation plate is further rotated in the counterclockwise direction by 90 degrees as shown in FIG. 1.

As shown in FIG. 1, the blow molding part 30 is arranged next to the temperature adjustment part 20, and has a blow mold 31 and an air blowing portion (not shown).

A mold surface, which corresponds to a shape of the container 1a, is formed on an inner side of the blow mold 31, and the bow mold 31 is much larger than the temperature adjustment cavity mold 22 of the temperature adjustment part 20.

The air blowing portion is provided so as to fill the air in the preform 1 inserted in the blow mold 31.

When the preform 1 conveyed to the blow molding part 30 is inserted into the blow mold 31, the air blowing portion is connected to the opening of the neck portion 3 of the preform 1 and the air is blown from the air blowing portion into the preform 1, the storage portion 2 of the preform 1 is inflated until the entire outer surface of the storage portion 2 comes into close contact with and is pressed to the mold surface of the blow mold 31, as shown in FIG. 5, so that the container Ta is molded.

The preform 1 (container Ta) blow-molded in the blow molding part 30 is pulled out from the blow mold 31 with being held by the neck mold 50, and is conveyed to the take-out part 40 as the rotation plate is further rotated in the counterclockwise direction by 90 degrees, as shown in FIG. 1.

As shown in FIG. 1, the take-out part 40 is arranged between the blow molding part 30 and the injection molding part 10. In the take-out part 40, the neck mold 50 is opened, so that the container T a is not held any more. As a result, the container T a is dropped, so that the container Ta is taken out from the blow molding apparatus 100.

In the blow molding apparatus 100 of the present embodiment, the preform 1 is demolded from the injection cavity mold 12 in the high-temperature state in which the preform 1 is cooled only to such a degree that the outer shape thereof can be maintained. Specifically, before an outer surface temperature (a temperature of a surface layer of an outer peripheral surface of the body portion 2a) of the body portion 2a of the preform 1 demolded from the injection molding part 10 becomes higher than an inner surface temperature (a temperature of a surface layer on an inner peripheral surface of the body portion 2a) of the body portion 2a, for example, at a temperature at which the outer surface temperature is higher than the glass transition temperature of the preform 1 by 30° C. or higher and 60° C. or lower, the preform 1 is inserted (carried) into the temperature adjustment part 20. The temperature adjustment part 20 is configured to cool the inner layer via the surface layers so as to lower the outer surface temperature of the preform 1 by 15° C. or higher and 30° C. or lower from a temperature at a time when the preform 1 is inserted (carried) into the temperature adjustment part 20. Note that, the glass transition temperature of the preform 1 made of PET is about 75° C., for example.

Usually, the preform 1 molded with sufficient time in the injection molding part 10 tends to strongly contact the injection core mold 11 by shrinkage of the resin and to separate from the injection cavity mold 12, so that the outer surface temperature of the preform 1 is higher than the inner surface temperature at a time when the preform is conveyed to the temperature adjustment part. Further, a temperature gradient (heat gradient) between the inner layer and the surface layer of the preform 1 is relatively small.

On the other hand, the blow molding apparatus 100 of the present embodiment is configured so that the preform 1 is conveyed to the temperature adjustment part 20 at a much higher temperature as compared to that of the conventional art. Since the preform 1 is demolded from the injection core mold 11 and the injection cavity mold 12 in the injection molding part 10 in a state where the residual heat of the inner layer is higher than that of the conventional art, the temperature gradient between the inner layer and the surface layer becomes greater than that of the conventional art. Therefore, heat exchange by the heat transfer between the inner layer and the surface layer of the preform 1 is actively performed. Thereby, during the conveying to the temperature adjustment part 20, the outer surface temperature of the preform 1 is once increased by return heat (transfer of heat from the inner layer to the surface layer), so that the temperature difference between the inner layer and the surface layer is significantly reduced and the temperature uniformizing and the temperature unevenness removing are promoted using the short conveying time between the injection molding part 10 and the temperature adjustment part 20 (a demolding operation time of the injection molding part 10 and a conveying time from the injection molding part 10 to a next process, for example 4.0 seconds or longer and 12.0 seconds or shorter, and more preferably 4.0 seconds or longer and 8.0 seconds or shorter). Specifically, the high-temperature demolding promotes the transfer of heat to such a degree that the temperature of the surface layer of the preform 1 rapidly rises from a temperature (for example, 5.0° C. to 20.0° C.) close to the injection molding mold to a temperature of 110° C. or higher and 130° C. or lower, thereby improving the effects of uniformizing the temperature and removing the temperature unevenness of the preform 1 (during the conveying time, the temperature of the surface layer of the preform 1 is rapidly increased to 110° C. or higher and 130° C. or lower with respect to a setting temperature (for example, 5.0° C. or higher and 20° C. or lower) of the injection mold). At the same time, during the conveying time, the preform 1 is cooled by the outside air and the extra heat of the preform 1 generated by the high-temperature demolding is discharged to the outside air, so that the cooling time of the inner layer required in the next process (the temperature adjustment part 20 or the blow molding part 30) is shortened. Accordingly, the cooling efficiency of the inner layer and the temperature adjusting efficiency of the inner layer and the surface layer of the preform 1 in the temperature adjustment part 20 are improved. As a result, it is possible to lower the temperature of the preform to a temperature lower than the crystallization temperature range in a short time, to adjust the preform to a temperature distribution state suitable for stretch orientation in a short time, and therefore, to manufacture a container having high transparency and physical properties in a short time. Further, due to the high-temperature demolding, the surface layer of the preform 1 is put to high temperatures and softened before the next process, so that the roughness originating from the injection core mold or the injection cavity mold transferred to the surface layer of the preform 1 can be eliminated. Accordingly, the roughness of the surface layer of the preform 1 immediately before the blow molding can be reduced, as compared to the conventional art, so that the container 1a whose surface roughness is small and surface gloss is high can be manufactured.

Hereinafter, the temperature adjustment of the preform 1 injection-molded in the injection molding part 10, which is performed in the temperature adjustment part 20, is specifically described.

FIG. 6 is a graph of a temperature distribution of the preform when a temperature of a preform is adjusted.

(a) of FIG. 6 shows a temperature distribution immediately before temperature adjustment (cooling) in the temperature adjustment part. In (a) of FIG. 6, the horizontal axis indicates positions in the thickness direction, the vertical axis indicates temperatures, a temperature distribution curve C1 indicates a temperature distribution before temperature adjustment of the conventional art in which a predetermined conveying time (about 5 seconds, specifically, 4.0 seconds or longer and 8.0 seconds or shorter) has elapsed immediately after demolding, and a temperature distribution curve C2 indicates a temperature distribution before temperature adjustment of the present embodiment in which the predetermined conveying time (about 5 seconds, specifically, 4.0 seconds or longer and 8.0 seconds or shorter) has elapsed immediately after demolding. Further, in (a) of FIG. 6, a temperature distribution curve C1*a* indicates a temperature distribution immediately after demolding from the injection molding part 10 of the conventional art, and a temperature distribution curve C2*a* indicates a temperature distribution immediately after demolding from the injection molding part 10 of the present embodiment.

(b) of FIG. 6 shows a temperature distribution immediately after temperature adjustment (cooling) in the temperature adjustment part. In (b) of FIG. 6, the horizontal axis indicates positions in the thickness direction, the vertical axis indicates temperatures, a temperature distribution curve C3 indicates a temperature distribution after temperature adjustment of the conventional art, and a temperature distribution curve C4 indicates a temperature distribution before temperature adjustment of the present embodiment. Also, a temperature distribution curve C5 shown with a broken line indicates a temperature distribution immediately after the temperature of the preform is adjusted by a cold parison method.

In the blow molding apparatus 100 of the present embodiment, as shown with the temperature distribution curves C2 and C2*a* in (a) of FIG. 6, the outer surface temperature of the preform 1 is increased from about 20° C. to about 120° C., i.e., by about 100° C. during the conveying time of about 5 seconds immediately after demolding from the injection molding part 10, and is rapidly increased by 80° C. or more in a short time. Specifically, in the blow molding apparatus 100 of the present embodiment, as shown with the temperature distribution curve C2 in (a) of FIG. 6, the preform 1 is inserted into the temperature adjustment part 20 in a state where the outer surface temperature of the preform 1 is higher than about 75° C., which is the glass transition temperature of the preform 1 made of PET, by about 30° C., i.e., is about 115° C. At this time, the inner surface temperature of the preform 1 is about 117° C., and the outer surface temperature is lower than the inner surface temperature.

On the other hand, in the temperature adjustment by the conventional art, as shown with the temperature distribution curves C1 and C1*a*, the outer surface temperature of the preform 1 can be increased from about 20° C. to about 80° C., i.e., only by about 60° C. during the conveying time of about 5 seconds immediately after demolding from the injection molding part 10. Specifically, in the temperature adjustment by the conventional art, since the injection molding process is performed for a long time and the preform is thus cooled for a long time, the preform is inserted into the temperature adjustment part in a state where the outer surface temperature of the preform 1 is about 87° C., as shown with the temperature distribution curve C1. At this time, the outer surface temperature is higher than the inner surface temperature.

Since the temperature adjustment part 20 of the present embodiment is configured to adjust the temperature of the preform 1 mainly in the temperature adjustment part 20, the outer surface temperature of the temperature-adjusted preform 1 is lowered to about 85° C., as shown with the temperature distribution curve C4 in (b) of FIG. 6. At this time, the outer surface temperature is higher than the inner surface temperature.

On the other hand, in the temperature adjustment by the conventional art, since the heat accumulated at the center of the wall portion of the preform is transferred to the inner surface and the outer surface of the preform, the outer surface temperature of the temperature-adjusted preform 1 is increased to about 102° C., as shown with the temperature distribution curve C3. At this time, the outer surface temperature is higher than the inner surface temperature.

In addition, in the temperature adjustment of the preform prepared by the cold parison method, the outer surface temperature of the preform temperature-adjusted from a room temperature state is increased to about 100° C., as shown with the temperature distribution curve C5. At this time, the outer surface temperature is higher than the inner surface temperature, and the outer surface temperature is substantially same as the outer surface temperature as shown with the temperature distribution curve C3 which is temperature adjustment of the conventional art by the hot parison method.

The blow molding apparatus 100 of the present embodiment is configured to insert the preform 1 into the temperature adjustment part 20 in a state where the outer surface temperature of the preform 1 is higher than the glass transition temperature of the preform 1 by 30° C. or higher and 60° C. or lower, and to cool the preform 1 to a predetermined temperature suitable for blow molding in the temperature adjustment part 20. Thereby, the injection molding process can be performed in a short time, so that the molding cycle time can be shortened and the preform can be sufficiently cooled in the temperature adjustment part 20. Therefore, it is possible to manufacture a container having a favorable quality even by the hot parison type injection blow molding mold.

Further, under molding conditions of the present embodiment where the cooling time of the injection molding process is set to ⅔ or shorter of the filling time, preferably ½ or shorter, and more preferably ⅓ or shorter, the preform 1 is demolded from the injection molding part 10 in a higher temperature state than the conventional art. Thereby, during the short conveying time (for example, 4 seconds or longer and 12 seconds or shorter, more preferably, 4.0 seconds or longer and 8.0 seconds or shorter) from the injection molding part 10 to a next process, the temperature of the preform 1 can be efficiently uniformized and can be thus lowered (an amount of heat is reduced), as a whole, as compared to the conventional art. In addition, the cooling time of the preform 1 or container 1*a* in a next process (the temperature adjustment part 20 or the blow molding part 30) can be shortened. As a result, even when the molding cycle time is shortened as compared to the conventional art, the container 1*a* whose appearance defects are suppressed can be manufactured.

Although the present invention has been described with reference to the embodiment, the present invention is not limited thereto. For example, in the above embodiment, the temperature adjustment part 20 configured to cool the preform 1 while sandwiching the preform with the temperature adjustment core mold 21 and the temperature adjustment cavity mold to compression-deform the preform 1 is used. However, the present invention is not limited thereto. A temperature adjustment part configured to arrange a preform between a temperature adjustment rod and a temperature adjustment pot and to blow and circulate the air inside the preform from the temperature adjustment rod may also be used as long as the outer surface temperature of the preform can be cooled by 15° C. or more in the temperature adjustment part.

In the above embodiment, the injection-molded preform 1 is cooled using the temperature adjustment part 20. However, the present invention is not limited thereto. The temperature adjustment part does not necessarily need to be used if the preform 1 can be cooled to a predetermined temperature suitable for blow molding.

REFERENCE SIGNS LIST

1: preform
2: storage portion
3: neck portion
4: gate
5: wall portion
10: injection molding part
11: injection core mold
12: injection cavity mold
1a: container
20: temperature adjustment part
21: temperature adjustment core mold
22: temperature adjustment cavity mold
30: blow molding part
31: blow mold
40: take-out part
50: neck mold
60: ring
100: blow molding apparatus (manufacturing apparatus for manufacturing resin container)
Z: axis center

The invention claimed is:

1. A manufacturing apparatus for manufacturing a resin container, the manufacturing apparatus comprising:
    an injection molding part configured to injection-mold a preform; and
    a temperature adjustment part configured to adjust a temperature of the preform molded in the injection molding part,
    wherein the manufacturing apparatus is configured to blow-mold the preform whose temperature has been adjusted in the temperature adjustment part,
    wherein the injection molding part includes an injection core mold and an injection cavity mold, and both the injection core mold and the injection cavity mold include a flow path connected to a chiller in which coolant is configured to flow to cool the preform such that the preform is inserted into the temperature adjustment part in a state where an outer surface temperature of the preform is higher than a glass transition temperature of a material constituting the preform by 30° C. or higher and 60° C. or lower,
    wherein the preform is cooled to a predetermined temperature suitable for blow molding in the temperature adjustment part.

2. The manufacturing apparatus for manufacturing the resin container according to claim 1,
    wherein the temperature adjustment part is configured to sandwich the preform with a temperature adjustment core mold and a temperature adjustment cavity mold to compression-deform the preform.

3. The manufacturing apparatus for manufacturing the resin container according to claim 1,
    wherein the temperature adjustment part is configured to circulate air inside the preform.

4. A manufacturing method for manufacturing a resin container, the manufacturing method comprising:
    injection-molding a preform;
    adjusting a temperature of the preform to which the injection-molding has been performed in a temperature adjustment part; and
    blow-molding the preform whose temperature has been adjusted,
    wherein the preform is inserted into the temperature adjustment part in a state where an outer surface temperature of the preform is higher than a glass transition temperature of a material constituting the preform by 30° C. or higher and 60° C. or lower; and
    wherein the preform is cooled to a predetermined temperature suitable for blow molding in the temperature adjustment part.

5. The manufacturing method for manufacturing the resin container according to claim 4,
    wherein the temperature adjustment part is configured to sandwich the preform with a temperature adjustment core mold and a temperature adjustment cavity mold to compression-deform the preform.

6. The manufacturing method for manufacturing the resin container according to claim 4,
    wherein the temperature adjustment part is configured to circulate air inside the preform.

* * * * *